(12) United States Patent
Ishihara et al.

(10) Patent No.: US 7,042,514 B1
(45) Date of Patent: May 9, 2006

(54) RECEPTION APPARATUS AND PICTURE DATA PROCESSING METHOD

(75) Inventors: Mitsugu Ishihara, Kanagawa (JP); Yoshio Kitamura, Kanagawa (JP); Makoto Niioka, Kanagawa (JP)

(73) Assignee: Sony Corporation, Tokyo (JP)

( * ) Notice: Subject to any disclaimer, the term of this patent is extended or adjusted under 35 U.S.C. 154(b) by 255 days.

(21) Appl. No.: 09/639,413

(22) Filed: Aug. 14, 2000

(30) Foreign Application Priority Data

Aug. 16, 1999  (JP) .................... 11-230051

(51) Int. Cl.
*H04N 7/00* (2006.01)

(52) U.S. Cl. .................................... 348/552
(58) Field of Classification Search ............... 348/552, 348/460, 461, 473, 553, 468; 358/1.15, 1.13, 358/1.17, 1.9, 401, 1.14
See application file for complete search history.

(56) References Cited

U.S. PATENT DOCUMENTS

| | | | | |
|---|---|---|---|---|
| 4,626,926 A | * | 12/1986 | Nakamura | 358/296 |
| 5,070,404 A | * | 12/1991 | Bullock et al. | 348/460 |
| 5,111,285 A | * | 5/1992 | Fujita et al. | 358/500 |
| 5,296,945 A | * | 3/1994 | Nishikawa et al. | 358/518 |
| 5,488,405 A | * | 1/1996 | Kawaoka | 347/251 |
| 5,497,204 A | * | 3/1996 | Ko | 348/715 |
| 5,497,372 A | * | 3/1996 | Nankoh et al. | 370/480 |
| 5,617,138 A | | 4/1997 | Ito et al. | |
| 5,636,315 A | * | 6/1997 | Sugiyama et al. | 386/46 |
| 5,857,149 A | * | 1/1999 | Suzuki | 455/186.1 |
| 5,859,652 A | * | 1/1999 | Silverbrook | 347/2 |
| 6,111,613 A | * | 8/2000 | Sasano et al. | 348/468 |
| 6,275,306 B1 | * | 8/2001 | Wataya et al. | 358/445 |
| 6,297,851 B1 | * | 10/2001 | Taubman et al. | 348/572 |
| 6,366,359 B1 | * | 4/2002 | Garland | 358/1.15 |

FOREIGN PATENT DOCUMENTS

| | | |
|---|---|---|
| GB | 2 304 253 | 3/1997 |
| WO | WO 97 27698 | 7/1997 |

* cited by examiner

*Primary Examiner*—Paulos M. Natnael
(74) *Attorney, Agent, or Firm*—Frommer Lawrence & Haug LLP; William S. Frommer; Darren M. Simon

(57) ABSTRACT

A receiver in which, when a picture of television broadcast demonstrated on a picture display device is to be printed, the picture selected by the user can be checked without intermission of pictures of television broadcast. When a command for printing a picture demonstrated on a display monitor 3 is inputted from a command input unit 29, picture data held by the frame memory 27 is outputted as printing data from a print data outputting unit 30. The picture data held by the frame memory 27 is synthesized to data of the next picture supplied from the picture color signal circuit unit 24. The resulting synthesized picture data is outputted as display data from a display data output unit 25. The display monitor 3 generates e.g., a picture-in-picture type slave image plane in which to display the print image.

5 Claims, 4 Drawing Sheets

RECEPTION APPARATUS AND PICTURE DATA PROCESSING METHOD

BACKGROUND OF THE INVENTION

1. Field of the Invention

This invention relates to a reception apparatus for receiving television broadcast and a method for processing picture data of the television broadcast.

2. Description of the Related Art

Heretofore, there is known a method employing an analog video printer as a method for printing a picture demonstrated on a display monitor of a television receiver.

In this case, the same analog picture signals as a picture demonstrated on the display monitor of the television receiver are supplied from the television receiver to the analog video printer. The analog picture signals, supplied to the analog video printer, are digitized and sequentially written in a frame memory in the analog video printer in terms of a frame of the picture demonstrated on the display monitor as a unit.

If a user has issued a command for printing a picture demonstrated on the display monitor, the frame memory of the analog video printer ceases to be updated, so that the picture to be printed is determined. Then, data of the picture to be printed is read out from the frame memory and converted into data for printing. Based on these data for printing, the analog video printer executes the processing for printing. This prints the picture demonstrated on the display monitor of the television receiver.

Meanwhile, in printing pictures or letters using a printer, it usually takes tens of seconds since the printer has started the processing for printing until the processing comes to a close. On the other hand, pictures of television broadcast are demonstrated on the display monitor of the television receiver one after another.

The result is that, when printing a picture demonstrated on the display monitor of the television receiver, the contents of the picture demonstrated on the display monitor of the television receiver are changed in the course of processing for printing by the printer, so that, when the processing for printing by the printer comes to a close, it may be an occurrence that a picture being printed differs completely from a picture demonstrated on the display monitor of the television receiver.

In such case, the user, who has selected the picture to be printed at an instant from a temporally changing picture sequence, necessarily feels uneasy whether or not the selected picture is an appropriate one or whether or not a mistake has not been made in the operating timing. However, the user is unable to confirm this until the processing for printing by the printer comes to a close.

As a method for the user to confirm the picture for printing, it may be contemplated to cause the display monitor of the television receiver to continue to display the picture selected by the user, without displaying the pictures of the television broadcast now on air, until the processing for printing by the printer of the user-selected picture comes to a close, or until the user confirms the contents thereof.

However, it is also inconvenient if the sequence of pictures demonstrated on the display monitor of the television receiver is interrupted in this manner each time the processing for printing is executed.

SUMMARY OF THE INVENTION

It is therefore an object of the present invention to provide a reception apparatus and a picture data processing method in which, in printing a picture of a television broadcast demonstrated on the display monitor of the television receiver, the user is enabled to check the picture he or she has selected, without interrupting the displayed pictures of the television broadcast.

In one aspect, the present invention provides a receiver for receiving television broadcast and for synthesizing plural received pictures, including a reception antenna for receiving television broadcast, display data outputting means for outputting picture data of the television broadcast received over the reception antenna as display data to a picture display device, a picture data memory for transiently storing the picture data from one image plane demonstrated on the picture display device to another, printing command inputting means for inputting a command for printing a picture demonstrated on the picture display device, printing command outputting means for reading out picture data held on the picture data memory to output the picture data as printing data to a printing device when a command for printing the image plane demonstrated on the picture display device when a command for printing an image plane demonstrated on the picture display device is inputted to the printing command inputting means and picture data synthesis means for synthesizing picture data of television broadcast received over the reception antenna to the picture data held on the picture data memory when a command for printing the image plane demonstrated on the picture display device is inputted to the printing command inputting means.

When the command for printing the image plane demonstrated on the picture display device is inputted to the printing command inputting means, the display data outputting means outputs picture data synthesized by the picture data synthesis means as display data to the picture display device to display a printing image in a portion of an image plane of the picture display device.

With this reception apparatus, television broadcast is received by reception means. The picture data of the television broadcast, received by this reception means are outputted by display data outputting means on the picture display device as display data. On the other hand, picture data of the television broadcast are temporarily held by data holding means from one image plane demonstrated on the picture display device to another.

Moreover, in this reception apparatus, a command for printing a picture demonstrated on the picture display device is inputted to printing command input means. When the command for printing the picture demonstrated on the picture display device is inputted to the printing command input means, picture data held by the picture data holding means is read out and outputted as printing data to the printing device.

When the command for printing the picture demonstrated on the picture display device is inputted to the printing command input means, picture data synthesis means synthesizes the picture data of the television broadcast received by the reception means to the picture data held by the picture data holding means. The synthesized picture data is outputted by the display data outputting means to the picture display device as display data.

That is, if, in this reception apparatus, no command for printing a picture demonstrated on the picture display device is inputted to the printing command input means, picture data of the television broadcast received by the reception means is directly outputted as display data to the picture display device.

On the other hand, if the command for printing the picture demonstrated on the picture display device is inputted to the printing command input means, the printing data output means reads out the picture data held by the picture data holding means to output the picture data as printing data to the printing device, while the picture data synthesis means synthesizes the picture data of the television broadcast received by the reception means to the picture data held by the image data holding means to output the synthesized picture data as display data to the picture display device. This displays a printing image in a portion of the image plane of the picture display device.

In the reception apparatus according to the present invention, in which, when a command for printing a picture demonstrated on the picture display device is inputted to the printing command input means, the picture data synthesis means synthesizes the picture data of the television broadcast received by the reception means to the picture data held by the picture data holding means and outputs the synthesized picture data as display data on the display data output means to demonstrate a printing image in a portion of the image plane of the picture display device, the picture data of the television broadcast may be demonstrated on the picture display device without intermission, while the user is able to confirm the picture desired to be printed.

Meanwhile, in the reception apparatus according to the present invention, the picture display device is desirably connected over an internal bus to the display data output means. By connecting the picture display device in this manner to the display data output means over an internal bus, the picture display device can be unified to the reception apparatus to transmit the display data from the display data output means at an elevated speed to the picture display device.

Moreover, in the reception apparatus of the present invention, the printing device is desirably connected to the printing device output means over an internal bus. By connecting the printing device over the internal bus to the printing data output means, the printing device can be unified to the reception apparatus to transmit the printing data from the printing data output means at an elevated speed to the printing device.

In another aspect, the present invention provides a picture data processing method in which picture data of the television broadcast received by reception means is supplied as display data to a picture display device to demonstrate an image plane corresponding to the display data on the picture display device, the picture data is stored in picture data storage means from one image plane demonstrated on the picture display device to another, and in which, when a command for printing an image plane demonstrated on the picture display device is inputted, picture data held in the picture data holding means is read out and outputted as printing data to a printing device, and the picture data of television broadcast received by the receiving means is synthesized to picture data held in the picture data holding means. The resulting synthesized data is routed as display data to the picture display device for demonstrating a print image on a portion of an image plane of the picture display device.

With this picture data processing method, picture data of the television broadcast can be demonstrated on the picture display device without intermission, when printing the image plane demonstrated on the picture display device, while the user is able to check the picture desired to be printed.

DESCRIPTION OF THE PREFERRED EMBODIMENTS

Figure 1:
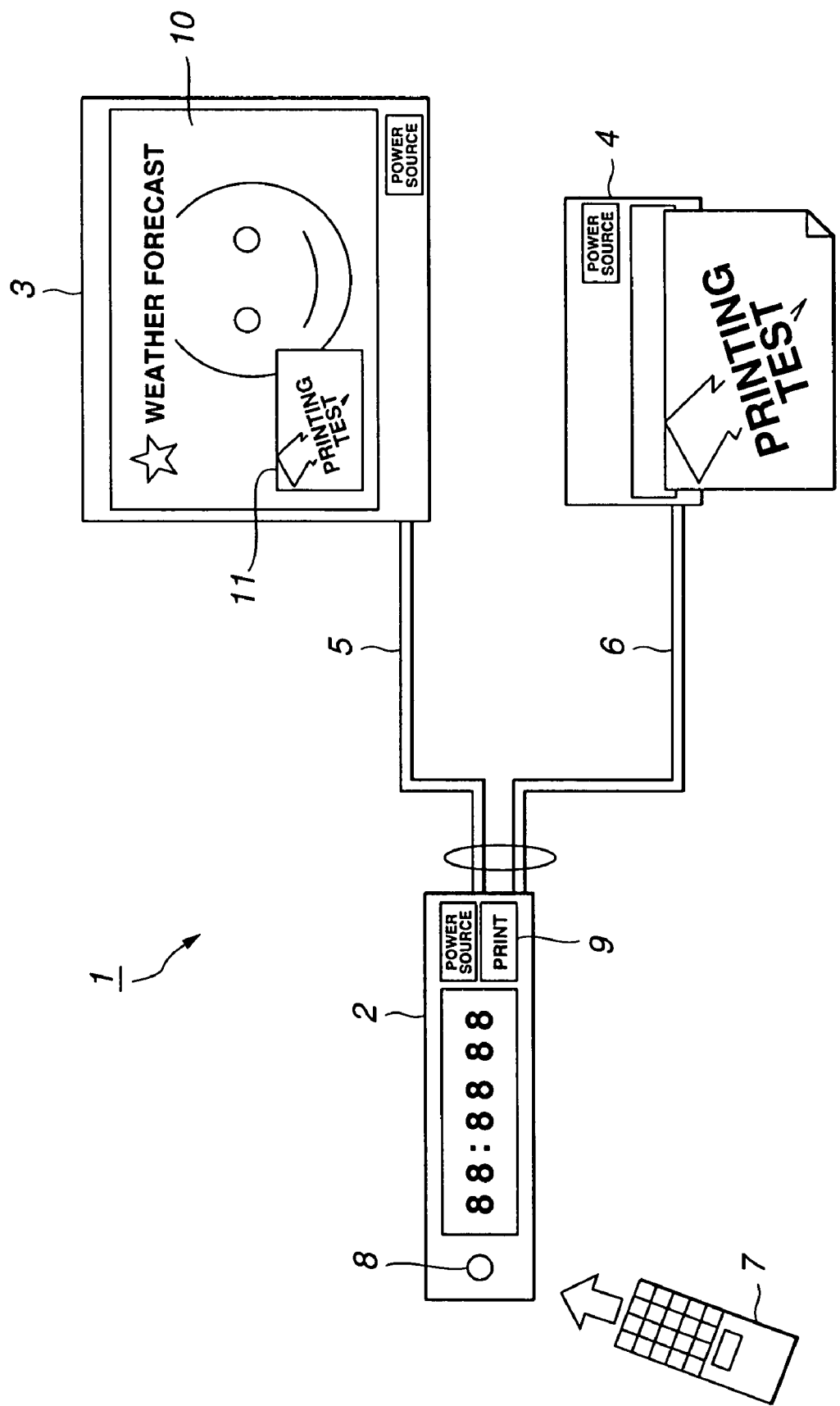
FIG. 1 is a schematic view showing an illustrative structure of a picture printing system according to the present invention.

Referring to the drawings, preferred embodiments of the present invention will be explained in detail.

FIG. 1 schematically shows an example of a picture printing system 1 comprised of a display monitor 3 and a printer 4, connected to a receiver 2 embodying the present invention.

In this picture printing system 1, the receiver 2 and the display monitor 3 are interconnected over an external bus 5, whilst the receiver 2 and the printer 4 are interconnected over an external bus 6. These external buses 5, 6 may, for example, be iLINK buses.

The receiver 2 receives analog television broadcast or digital television broadcast, and routes picture data of the television broadcast over the external bus 5 to the display monitor 3, such as CRT (cathode ray tube) or LCD (liquid crystal display), to demonstrate a picture corresponding to the picture data on the display monitor 3. The receiver 2 also includes an internal frame memory so that received picture data of the television broadcast can be transiently held from one image plane demonstrated on the display monitor 3 to another.

The receiver 2 also is provided with means for accepting a command from a user for printing a picture now being demonstrated on the display monitor 3. Among means for accepting a command by the user, there are, for example, a reception unit 8 for receiving signals from a remote controller 7 and a "printing" button 9 provided on a front panel.

On reception of a command by a user to print the picture now being demonstrated on the display monitor 3, such as on reception by the reception unit 8 of signals from the remote controller 7 or on pushing the "printing" button 9 provided on the front panel, the receiver 2 reads out the picture data held in the frame memory to send the read-out picture data as printing data over external bus 6 to the printer 4, such as a color laser printer, to cause a picture corresponding to the picture data, that is the picture demonstrated currently on the display monitor 3, for example, the picture demonstrated at an instant of pushing the "printing" button 9, to be printed by the printer 4.

On the other hand, on reception of a command by a user to print a picture demonstrated on the display monitor 3, the receiver 2 synthesizes the picture data of the television broadcast being received to the picture data transiently held in the frame memory, to send the synthesized picture data to the display monitor 3, to generate a slave image plane 11 of, for example, the picture-in-picture or the window type on an image plane 10 of the display monitor 3, to demonstrate the picture to be printed by the printer 4 (print image) in this slave image plane 11.

That is, in the present picture printing system 1, the picture data of the television broadcast, currently received by the receiver 2, are usually supplied directly to the display monitor 3, on which a sequence of pictures corresponding to the picture data of television broadcast are demonstrated as moving pictures on the display monitor 3. If the user inputs a command for printing the picture demonstrated currently on the display monitor 3 to the receiver 2, the picture data of the television broadcast and the picture data transiently stored in the frame memory are synthesized together. The synthesized picture data then are routed to the display monitor 3. This generates a slave image plane 11 on the image plane 10 representing the moving pictures of the display monitor 3 so that a print image is demonstrated as a still image in the slave image plane 11.

This permits the user to refer to the slave image plane 11 of the display monitor 3 to check the picture about to be printed. Since the portion of the image plane 10 of the display monitor 3 other than the slave image plane 11 continues to display moving pictures corresponding to the picture data of the television broadcast as before, the user is able to view the moving pictures corresponding to the picture data of the television broadcast without intermission.

Meanwhile, the slave image plane 11, generated in the image plane 10 of the display monitor 3, is obstructive for the user in viewing the moving picture displayed on the master image plane. Therefore, the display of this image plane 10 is desirably terminated when the user has checked the picture to be printed. Specifically, with the present picture printing system 1, the display of the input pinch roll 11 is desirably terminated at a time point when the processing for printing by the printer 3 has come to a close, or when a command for terminating the display of the print image is inputted to the receiver 2.

In the above description, the slave image plane 11 is generated in the image plane 10 of the display monitor 3 when a command for printing a picture demonstrated on the display monitor 3 is inputted by the user, and a print image is displayed in the slave image plane 11, whilst moving pictures corresponding to he image data of the television broadcast are continuously displayed in the main image plane. Conversely, the moving pictures may be continuously displayed on the slave image plane 11 generated in the image plane 10 of the display monitor 3, as a print image is displayed in the main image plane.

An arrangement in which the receiver 2 receives the analog television broadcast is explained in further detail.

Figure 2:
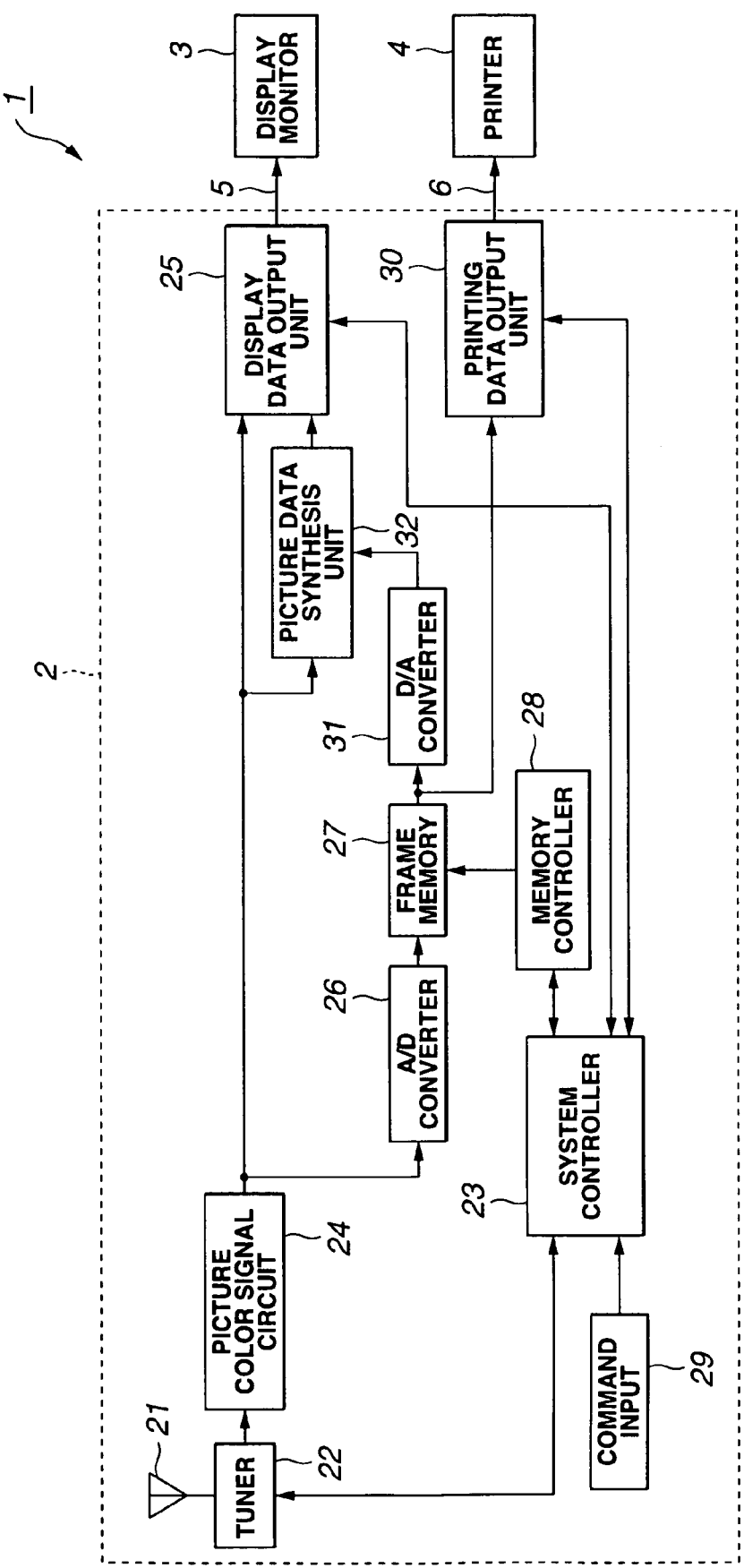
FIG. 2 is a block diagram a typical picture print system constructed to permit a receiver to receive the analog television broadcast.

FIG. 2 shows a block diagram of a typical picture printing system 1 having a receiver 2 for receiving analog television broadcast.

The analog television broadcast, sent out from a broadcasting station as the ground wave, is received by an antenna 21 of the receiver 2, and thence supplied to a tuner 22. The tuner 22 performs processing operations, such as channel selection, under control by a system controller 23, and sends out the picture data of the selected channel to a picture color signal circuit unit 24.

The picture data, supplied to the picture color signal circuit unit 24, is separated in this picture color signal circuit unit 24 into analog RGB. The picture data, separated into analog RGB, is sent to a display data output unit 25, while being converted by an A/D converter 26 into digital data, which is written in a frame memory 27.

The display data output unit 25 sends the analog RGB, supplied from the picture color signal circuit unit 24, to the display monitor 3 over the external bus 5, as display data, under control by the system controller 23. This causes a picture of the analog television broadcast to be demonstrated on the display monitor 3.

The frame memory 27 temporarily stores the picture data, converted into digital data in the A/D converter 26, from one frame of the picture of the analog television broadcast demonstrated on the display monitor 3 to another. That is, data corresponding to a frame currently represented on the display monitor 3 is held in this frame memory 27. When the frame of the picture demonstrated on the display monitor 3 is switched to the next frame, and data of the next frame is sent to the frame memory 27, the frame memory 27 is updated, so that the data of the next frame is held in the frame memory 27.

Meanwhile, data writing and readout to or from the frame memory 27 is performed by a memory controller 28 under control by the system controller 23.

When the user inputs a command for printing the picture currently represented on the display monitor 3 to a command input unit 29, the memory controller 28 halts the updating of the frame memory 27 to read out the picture data held by the frame memory 27, that is the data of he picture currently represented on the display monitor 3.

The picture data read out from the frame memory 27 is supplied to a print data outputting unit 30, while being converted in a D/A converter 31 into analog signals which are supplied to a picture data synthesis unit 32.

The print data outputting unit 30 sends the picture data read out from the frame memory 27 to the printer 4 as printing data over the external bus 6. The printer 4 performs printing based on the printing data supplied from the print data outputting unit 30 to print the user-specified picture demonstrated on the display monitor 3.

When fed with the picture data read out from the frame memory 27, the picture data synthesis unit 32 synthesizes the picture data read out from the frame memory 27 to the image data from the picture color signal circuit unit 24 to generate the slave image plane 11 in the image plane 10 of the display monitor 3, as well as to generate picture data, which permits the printing image to be demonstrated in the slave image plane 11, to send the generated picture data to the display data output unit 25.

The display data output unit 25 usually sends the analog RGB, supplied from the picture color signal circuit unit 24, to the display monitor 3 as display data. When a printing command is inputted by the user from the command input unit 29, and the synthesized picture data are supplied from the picture data synthesis unit 32, the display data output unit 25 sends the synthesized picture data as display data to the display monitor 3.

Thus, in the image plane 10 of the display monitor 3, a slave image plane 11 of, for example, the picture-in-picture type, is generated, and a picture of a usual analog television broadcast is demonstrated in the main image plane, whilst a print image is demonstrated in the slave image plane 11. Alternatively, the print image is demonstrated on the mai image plane, whilst a picture of a usual analog television broadcast is demonstrated in the slave image plane 11.

More specifically, the above-described picture printing system 1, that is the picture printing system 1 having a receiver 2 for receiving the analog television broadcast, is realized by providing a frame memory, having the functions of accepting a print command and of temporarily holding picture data, in an analog television receiver having the function of generating a picture-in-picture type slave picture, and by connecting a printer to this analog television receiver.

An embodiment in which the receiver 2 is configured for receiving the digital television broadcast is hereinafter explained.

Figure 3:
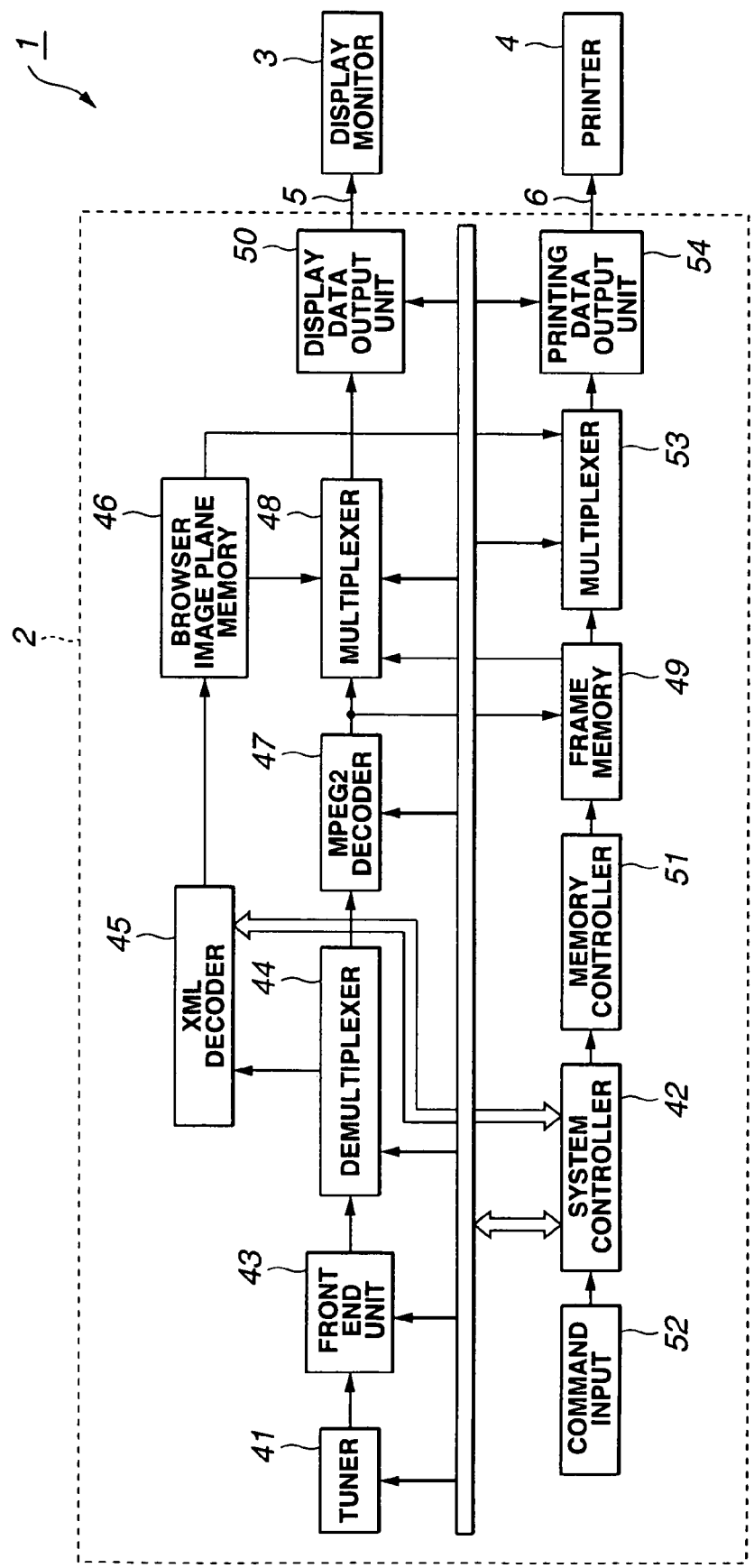
FIG. 3 is a block diagram showing a typical picture print system constructed to permit a receiver to receive the digital television broadcast.

FIG. 3 shows block diagram of an embodiment of the picture printing system 1 having a receiver 2 for receiving the digital television broadcast. In the picture printing system 1, shown in FIG. 3, the receiver 2 is configured as a set top box (STB) for receiving hybrid signals comprising moving picture data compressed in accordance with MPEG2, and the letter information, such as the XML data, multiplexed thereon.

The hybrid signal, transmitted from the broadcasting station as the digital satellite broadcast or cable television broadcast, is received over an antenna, cable modem etc by a tuner 41 of the receiver 2. The tuner 41 performs e.g., channel selection, under control by a system controller 42.

The hybrid signal of the selected channel is separated into a baseband wave and further separated by a demultiplexer 44 into the moving picture data compressed by the MPEG2 and the XML data.

The XML data, separated by the demultiplexer 44, is decoded by an XML decoder 45 and held by a browser image plane memory 46. On the other hand, the moving picture data, separated by the demultiplexer 44, is decoded by an MPEG2 decoder 47, so as to be routed to a multiplexer 48 and to a frame memory 49.

The multiplexer 48 synthesizes the moving picture data, decoded by the MPEG2 decoder 47, to the XML data held by the browser image plane memory 46, under control by the system controller 42, to generate display data, which is routed to a display data output unit 50.

The display data output unit 50 sends the display data, supplied from the multiplexer 48, to the display monitor 3 over the external bus 5. This demonstrates an image plane, consisting in a mixture of the moving picture and the letter information, on the display monitor 3.

The frame memory 49 transiently holds the moving picture data, decoded by the MPEG2 decoder 47, from one frame of the moving picture demonstrated on the display monitor 3 to another. That is, this frame memory 49 holds data for one frame of the moving pictures displayed on the display monitor 3. When the frame of the moving pictures demonstrated on the display monitor 3 is switched to the next frame, and data of the next frame is supplied to the frame memory 49, the frame memory 49 is updated, so that the data of the next frame are held by the frame memory 49.

Meanwhile, the writing and readout of data to or from the frame memory 49 is executed by a memory controller 51, under control by the system controller 42.

If now a command for printing a picture demonstrated on the display monitor 3 is inputted by the user to a command input unit 52, the memory controller 51 halts the updating of the frame memory 49 to read out the data of the frame picture held by the frame memory 49, that is the data of the moving picture demonstrated on the display monitor 3.

The moving picture data, read out from the frame memory 49, is sent to the multiplexer 48 and to a multiplexer 53.

The frame picture data supplied to the multiplexer 53 is synthesized in this multiplexer 53 with the XML data held by the browser image plane memory 46. The synthesized image is supplied to a print data output unit 54 as print data.

The print data output unit 54 routes the print data, supplied from the multiplexer 53, over the external bus 6 to the printer 4. The printer 4 performs the printing, based on the printing data supplied from the print data output unit 54, to print out an image plane consisting in a mixture of the picture on the display monitor 3 as designated by the user and the letter information.

Meanwhile, if the frame picture data read out from the frame memory 49 is directly supplied to the print data output unit 54 as display data, without the intermediary of the multiplexer 53, it is possible to print only the picture on the display monitor 3 specified by the user.

Usually, the multiplexer 48 synthesizes the moving picture data from the MPEG2 decoder 47 to the XML data held by the browser image plane memory 46, as described above, to generate display data, which is supplied to the display data output unit 50. However, if a printing command is inputted from the user to the command input unit 52, and the frame picture data, as read out from the frame memory 49, is supplied to the multiplexer 48, the multiplexer synthesizes the frame picture data read out from the frame memory 49 to the display data comprised of the moving picture data from the MPEG2 decoder 47, synthesized to the XML data from the browser image plane memory 46, to generate the slave image plane 11 in the image plane 10 of the display monitor 3. The multiplexer 48 also generates display data which causes the printing image to be displayed in the slave image plane 11 to send the generated display data to the display data output unit 50.

This generates the slave image plane 11 of, for example, the picture-in-picture type slave image plane 11 in the image plane 10 of the display monitor 3, while displaying an image plane comprised of a mixture of the usual moving picture and the letter information, and a print image, in the main image plane and in the slave image plane 11, respectively. Alternatively, the print image and the image plane comprised of a mixture of the usual moving picture and the letter information are displayed in the main image plane and in the slave image plane 11, respectively.

If the multiplexer 48 synthesizes the XML data from the browser image plane memory 46 to the frame picture data read out from the frame memory 49 to prepare data for representing a print image, an image plane comprised of the picture on the display monitor 3, as specified by the user, and the letter information, existing as a mixture, is displayed as a print image. On the other hand, if the frame picture data read out from the frame memory 49 is directly used as data for demonstrating the print image, only the picture on the display monitor 3 specified by the user is displayed as a print image.

The foregoing description has been made of the picture printing system 1 in which the display monitor 3 is connected over the external bus 5, such as the iLINK, to the display data output units 25, 50 of the receiver. Alternatively, the display monitor 3 may be connected to a high-speed internal bus to the display data output units 25, 50 of the receiver. In this case, the display monitor 3 is unified to the receiver 2 so that the display monitor 3 and the receiver 2 together operate as a television receiver so that it is possible to transmit the display data from the display data output units 25, 50 at an elevated speed to the display monitor 3.

Also, the foregoing description has been made of the picture printing system 1 in which the printer 4 is connected to the print data outputting units 30, 54 of the receiver 2 over the external bus 6, such as iLINK. Alternatively, the printer 4 may also be connected over the high-speed internal bus to the print data outputting units 30, 54 of the receiver 2, in which case the printer 4 is unified to the receiver 2 so that the print data from the print data outputting units 30, 54 can be transmitted speedily to the printer 4.

Figure 4:
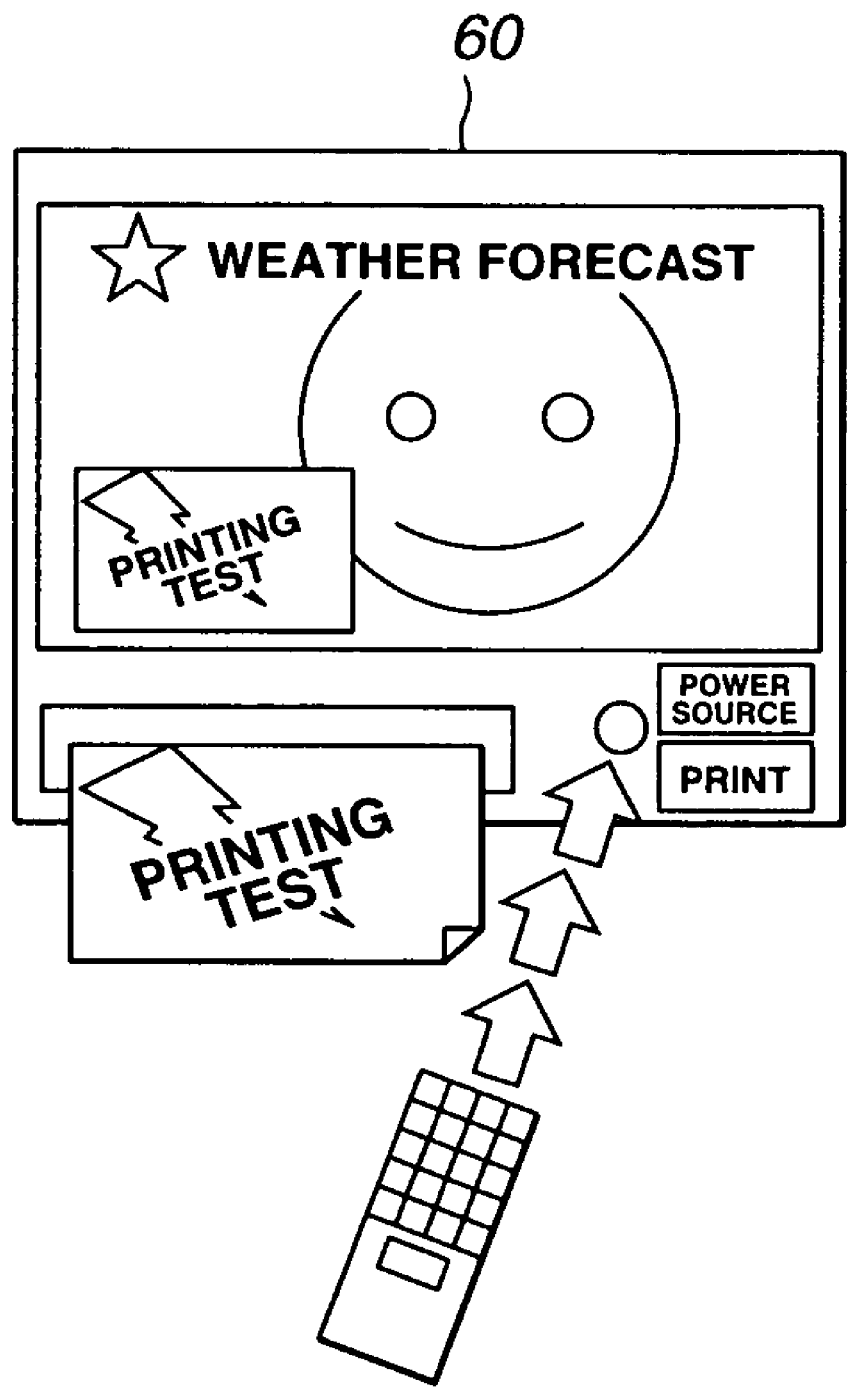
FIG. 4 is a schematic view showing printer built-in type television receiver in which a display monitor and a printer are unified to a receiver.

Moreover, if the display monitor 3 and the printer 4 are both connected to the receiver over high-speed internal buses, the picture printing system 1 is constructed as a printer-built-in type television receiver 60, as shown in FIG. 4. Since the picture printing system 1 is constructed in this manner as the printer-built-in type television receiver 60, it is possible to increase the data transfer rate between the receiver 2, display monitor 3 and the printer 4 as well as to improve the operability and to achieve space saving.

What is claimed is:

1. A receiver for receiving a television broadcast and for synthesizing plural received images, comprising:
   a reception antenna for receiving the television broadcast; wherein the television broadcast is formatted as a hybrid signal comprising compressed motion picture data and multiplexed letter information;
   demultiplexing means for demultiplexing the multiplexed letter information from the compressed motion picture data in the hybrid signal;
   decoding means for decoding the compressed motion picture data into images for display;
   multiplexing means for multiplexing the images of the decoded motion picture data with the letter information;
   display data outputting means for outputting the multiplexed images of the decoded motion picture data to a picture display device;
   a data frame memory for transiently storing therein one image of the decoded motion picture data from the decoding means, in which said one image is the same as that currently displayed by said picture display device;
   printing command inputting means for inputting a command for printing a desired image selected from the images displayed on said picture display device;
   printing command outputting means for reading out the desired image from the data frame memory to a printing device; and
   picture data synthesis means for synthesizing the multiplexed images of the decoded motion picture data with the desired image, thereby generating synthesized image data for display on the picture display device;
   wherein said picture display device is connected over a first external bus to said display data outputting means and said printing device is connected over a second external bus to said printing command outputting means.

2. A picture data processing method comprising the steps of:
   receiving television broadcast at a receiver; wherein the television broadcast is formatted as a hybrid signal comprising compressed motion picture data and multiplexed letter information;
   demultiplexing the multiplexed letter information from the compressed motion picture data in the hybrid signal;
   decoding the compressed motion picture data into images for display;
   multiplexing the images of the decoded motion picture data with the letter information;
   outputting the multiplexed images of the decoded motion picture data to a picture display device;
   transiently storing in a data frame memory, one image of the decoded motion picture data, in which said one image is the same as that currently displayed by said picture display device;
   inputting a command for printing a desired image selected from the images displayed on said picture display device;
   reading out the desired image from the data frame memory to a printing device; and
   synthesizing the multiplexed images of the decoded motion picture data with the desired image, thereby generating synthesized image data for display on the picture display device;
   wherein said receiver is connected over a first external bus to said picture display device and over a second external bus to said printing device.

3. The picture data processing method according to claim 2 wherein the step of synthesizing the received television broadcast with the desired image is terminated when said printing device prints the desired image.

4. The picture data processing method according to claim 2 wherein the step of synthesizing the received television broadcast with the desired image is terminated when a command for terminating the display of the synthesized image data is inputted.

5. The picture data processing method according to claim 2 wherein the step of synthesizing the received television broadcast with the desired image is terminated when a pre-set time has elapsed.

* * * * *